J. HOPKINSON.
PRICE SCALE.
APPLICATION FILED FEB. 10, 1912.
1,096,507.
Patented May 12, 1914.
2 SHEETS—SHEET 1.
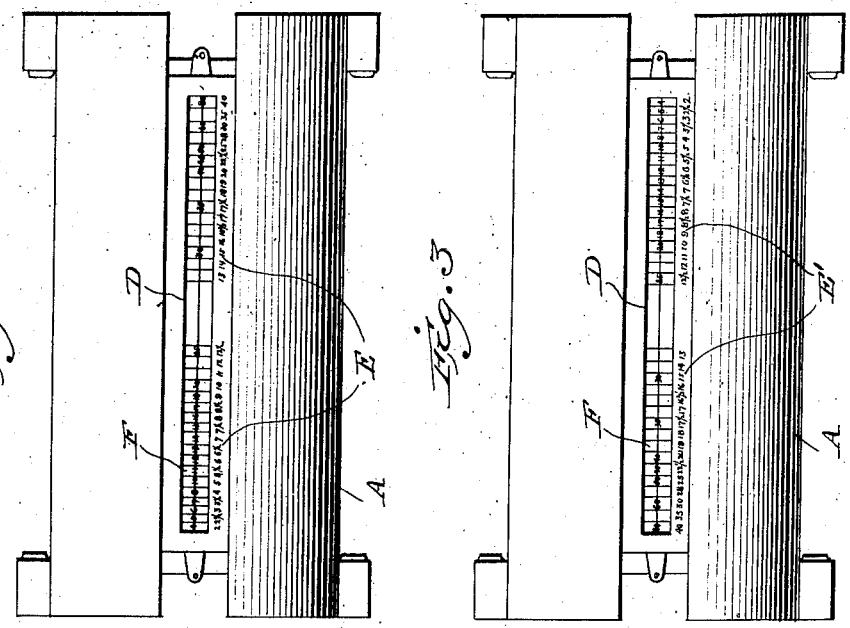
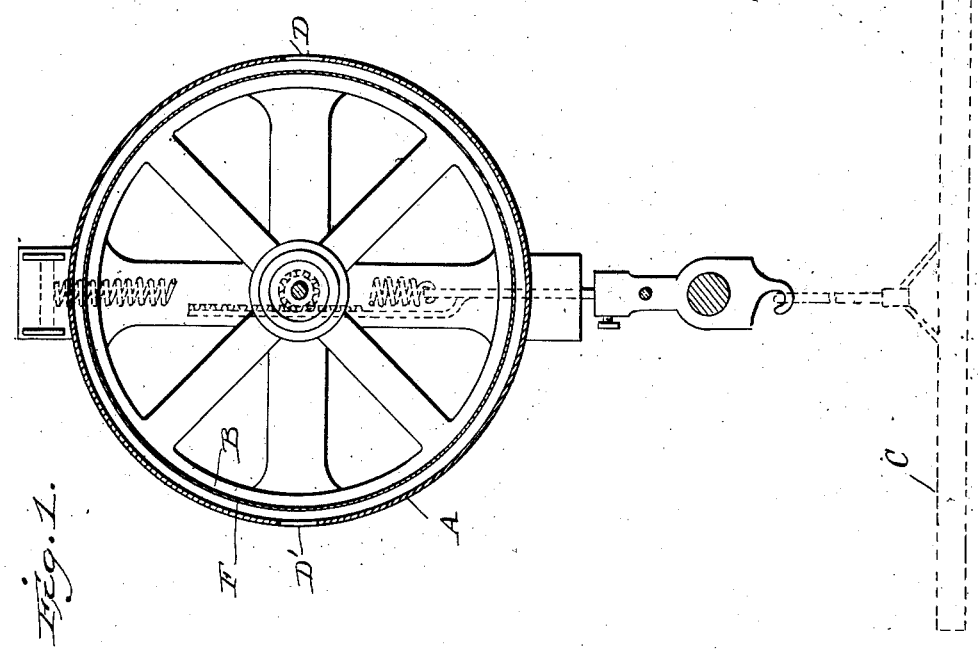
Witnesses
Elizabeth Griffith
Halbert Brown
Inventor
Joseph Hopkinson
By Church & Church
his Attorneys

J. HOPKINSON.
PRICE SCALE.
APPLICATION FILED FEB. 10, 1912.

1,096,507.

Patented May 12, 1914.

2 SHEETS—SHEET 2.

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

PRICE-SCALE.

1,096,507.  Specification of Letters Patent.  Patented May 12, 1914.

Application filed February 10, 1912.  Serial No. 676,855.

*To all whom it may concern:*

Be it known that I, JOSEPH HOPKINSON, a citizen of the United States, residing at Dayton, in the county of Montgomery and State of Ohio, have invented certain new and useful Improvements in Price-Scales; and I do hereby declare the following to be a full, clear, and exact description of the same, reference being had to the accompanying drawings, forming part of this specification, and to the figures and letters of reference marked thereon.

This invention relates to improvements in price scales of that type wherein a rotary drum is employed having upon its peripheral surface a large number of price computations arranged in columns or rows and adapted to be brought into position for indicating the value of articles weighed on the scale at any one of a large number of rates per pound or unit of value or weight.

The objects of the invention are to provide a scale of the rotary drum type in which the value or cost of the article being weighed at any rate within the capacity of the scale will be simultaneously exposed on diametrically opposite sides of the drum, whereby the value may be read simultaneously by both the merchant and his customer.

Scales are usually located on or over a store counter, and consequently the merchant and his customer normally stand on opposite sides of the scale. As heretofore constructed, the merchant alone was in position to read the computations of value, so that the customer was unable to determine from the scale itself the value of the particular commodity being purchased and the customer has, therefore, usually been under the necessity of making a computation, which, in most instances, is quite impractical without the use of pencil and paper, and in any event consumes considerable time, so there has practically been no check on the merchant. In some instances it has been attempted to locate the scales so that both the merchant and the customer could view the same computations on the chart, but this is found to be impractical because of the conventional arrangement of the counter between the customer and merchant, and it is quite impossible to make the charts of sufficient size to be read by the customer when the scale is located on the farther side of the merchant's position in the store, with a counter intervening between the merchant and customer.

In accordance with the present invention, the drum is provided with a chart having two identical sets of value computations thereon, the like value computations of one set being arranged on the opposite side of the drum from the computations of the other side, and the two sets being reversed in relative positions on the drum, whereby the rotation of the drum in one direction will bring the computations of both sets and of the corresponding figures of both sets simultaneously into view on opposite sides of the drum. A scale embodying the present improvement, therefore, embodies a drum mounted on an axis to rotate in accordance with the movement of the load support, such as the platform or pan, said drum being inclosed in a casing having sight openings on diametrically opposite sides for simultaneously exposing portions of both sets of value computations longitudinally of the axis of the drum, and a chart carried by the drum and having two sets of value computations so arranged that similar value computations at all rates per unit will be simultaneously exposed to view at both of the sight openings, whereby one set may be read by the merchant and the other set by the customer located on the opposite side of the scale.

Referring to the accompanying drawings,—Figure 1 is a section in a vertical plane of a horizontally arranged drum scale embodying the present improvements, certain of the well known features, such as the load support, being indicated in dotted lines; Fig. 2 is an elevation looking at one side of the drum and its inclosing casing; Fig. 3 is a corresponding view looking at the opposite side of the drum and its casing; Fig. 4 is a diagrammatic view illustrative of the chart which forms the periphery of the rotary drum with certain of the value computations thereon to show the preferred arrangement of the two sets of value computations.

Like letters of reference in the several figures indicate the same parts.

In its general mechanical construction, the scale of the present invention corresponds to well known scales now in extensive public use; that is to say, there is a casing A, which is adapted to be suspended or supported on suitable standards, and having journaled within it on a horizontal axis a rotary drum B, said drum being connected through suitable rack and pinion or equivalent connections, with a load support such as the pan C indicated in Fig. 1. Counterbalancing springs are employed usually, located at each end of the drum, and extending longitudinally of the casing on diametrically opposite sides thereof are corresponding sight openings D, D'. In proximity to each of said sight openings, preferably on the lower side thereof, the casing is provided with a range of price per unit indications E, E', respectively, said price per unit indications or figures being in the preferred construction arranged reversely with relation to each other, that is to say on one side of the scale they read from right to left and on the opposite side from left to right.

The chart F which forms the periphery of the rotary drum, is provided with two sets of value computations, so disposed on the drum that corresponding figures of each set will be exposed through the sight openings in immediate proximity to corresponding figures of price per unit indications, and, owing to the fact that the drum in the scale illustrated is mounted on a horizontal axis, the sets of value computations on the chart are arranged reversely with relation to each other, successive computations in one set being brought into view at its sight opening by a downward movement, and the computations of the other set being brought into view at its sight opening by an upward movement of the periphery of the drum. In this arrangement the merchant located on one side of the scale and the customer on the opposite side may simultaneously read corresponding value indications at any rate per unit, and both are therefore instantly advised of the value of the article being weighed and neither is under the necessity of making any mental calculations.

Having thus described my invention what I claim as new and desire to secure by Letters Patent of the United States, is:

In a price indicating scale, the combination with a cylindrical casing having sight openings on diametrically opposite sides and extending the entire length thereof, of a cylindrical rotary drum mounted in said casing and having on its periphery a value chart comprising a multiplicity of columns of value indications at different rates per unit, each column containing duplicate sets of indications, the corresponding indications of the two sets being located on diametrically opposite sides of the drum and inverted with respect to each other, whereby when exposed at the oppositely disposed sight openings they may be read in proper vertical position, and with the columns of value indications indicating values at progressively increasing rates, whereby corresponding readings may be had from either side of the scale and with the value indications in the same relative order, regardless of the angular position of the drum.

JOSEPH HOPKINSON.

Witnesses:
JAMES L. BOURNE,
HELEN A. LEONARD.